(12) United States Patent
Kim et al.

(10) Patent No.: US 12,351,022 B2
(45) Date of Patent: Jul. 8, 2025

(54) VEHICLE INFORMATION DISPLAY APPARATUS AND CONTROL METHOD THEREOF

(71) Applicant: HYUNDAI MOBIS CO., LTD., Seoul (KR)

(72) Inventors: Do Hyung Kim, Yongin-si (KR); Tae Kyoung Jin, Yongin-si (KR); Moo Kwan Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 114 days.

(21) Appl. No.: 17/379,159

(22) Filed: Jul. 19, 2021

(65) Prior Publication Data
US 2022/0032839 A1 Feb. 3, 2022

(30) Foreign Application Priority Data
Jul. 29, 2020 (KR) .................. 10-2020-0094297

(51) Int. Cl.
*B60K 35/00* (2024.01)
*B60Q 1/26* (2006.01)
(Continued)

(52) U.S. Cl.
CPC ............ *B60K 35/00* (2013.01); *B60Q 1/2603* (2013.01); *B60Q 1/50* (2013.01); *B60Q 1/5035* (2022.05);
(Continued)

(58) Field of Classification Search
CPC .......... G09F 13/32; G09F 21/04; G09F 9/375; B60R 11/0229; B60R 19/52; B60R 2011/0008; B60R 2019/505; B60R 2019/525; B60Q 1/2603; B60Q 1/28; B60Q 1/50; B60Q 1/503; B60Q 1/525; B60Q 2400/30; B60Q 5/005; B60Q 5/006; B60K 2370/1438; B60K 2370/1523;
(Continued)

(56) References Cited

U.S. PATENT DOCUMENTS

| 4,914,427 A * | 4/1990 | Trunk ................... G09F 9/375 |
| | | 40/449 |
| 6,000,812 A | 12/1999 | Freeman et al. |

(Continued)

FOREIGN PATENT DOCUMENTS

| CN | 110040066 A | 7/2019 |
| CN | 111065547 A | 4/2020 |

(Continued)

OTHER PUBLICATIONS

Extended European Search Report issued Dec. 21, 2021 in counterpart European Patent Application 21187710.5 (9 pages in English).

(Continued)

*Primary Examiner* — Omer S Khan
(74) *Attorney, Agent, or Firm* — NSIP Law

(57) ABSTRACT

A vehicle information display apparatus includes: at least one processor configured to receive a vehicle state of a vehicle, and detect a forward object ahead of the vehicle; a flip-dot display installed in the vehicle and configured to implement a pixel by rotating a flip disk; and an illumination module installed around the flip-dot display, and configured to illuminate a surface of the flip-dot display.

18 Claims, 6 Drawing Sheets

(51) Int. Cl.
*B60Q 1/50* (2006.01)
*B60Q 5/00* (2006.01)
*B60R 11/00* (2006.01)
*B60R 11/02* (2006.01)
*G09F 9/37* (2006.01)
*G09F 13/32* (2006.01)
*G09F 21/04* (2006.01)

(52) U.S. Cl.
CPC ............ *B60Q 1/543* (2022.05); *B60Q 1/549* (2022.05); *B60Q 5/006* (2013.01); *B60R 11/0229* (2013.01); *G09F 9/375* (2013.01); *G09F 13/32* (2013.01); *G09F 21/04* (2013.01); *B60R 2011/0008* (2013.01)

(58) Field of Classification Search
CPC ...... B60K 2370/1526; B60K 2370/155; B60K 2370/164; B60K 2370/165; B60K 2370/166; B60K 2370/173; B60K 2370/175; B60K 2370/176; B60K 2370/182; B60K 2370/332; B60K 2370/343; B60K 2370/52; B60K 2370/61; B60K 2370/774; B60K 2370/779; B60K 2370/797; B60K 35/00; B60K 37/04; B60K 37/06
See application file for complete search history.

(56) References Cited

U.S. PATENT DOCUMENTS

| | | | |
|---|---|---|---|
| 6,009,648 A * | 1/2000 | Tijanic | G09F 9/375 336/200 |
| 6,220,723 B1 | 4/2001 | Freeman et al. | |
| 6,278,431 B1 * | 8/2001 | Kao | G09F 9/375 40/449 |
| 2002/0067280 A1 * | 6/2002 | Carrillo | A63B 71/06 340/815.4 |
| 2003/0041492 A1 * | 3/2003 | Weinacht | G09F 9/375 40/449 |
| 2005/0000126 A1 | 1/2005 | Gray et al. | |
| 2011/0242839 A1 * | 10/2011 | Dunn | G02B 6/0073 362/606 |
| 2017/0210285 A1 | 7/2017 | Kobayashi et al. | |
| 2017/0243490 A1 * | 8/2017 | Leppänen | B60K 35/00 |
| 2017/0246988 A1 | 8/2017 | Ihedinmah | |
| 2018/0162271 A1 * | 6/2018 | Kim | G08G 1/166 |
| 2019/0217773 A1 | 7/2019 | Sasaki et al. | |
| 2021/0148535 A1 * | 5/2021 | Kim | G09F 9/33 |
| 2021/0188159 A1 * | 6/2021 | Fukutaka | B60Q 1/535 |

FOREIGN PATENT DOCUMENTS

| | | |
|---|---|---|
| DE | 20 2011002309 U1 | 6/2011 |
| DE | 10 2018201248 A1 | 8/2019 |
| DE | 11 2017008039 T5 | 7/2020 |
| EP | 3892490 A1 | 10/2021 |
| JP | 6523561 B1 | 6/2019 |
| KR | 10-1487904 B1 | 2/2015 |
| KR | 10-2020-0027092 A | 3/2020 |

OTHER PUBLICATIONS

Chinese Office Action issued on Jun. 1, 2023, in counterpart Chinese Patent Application No. 202110866942.8 (9 pages in Chinese).

Korean Office Action issued on Dec. 10, 2024, in counterpart Korean Patent Application No. 10-2020-0094297 (6 pages in English, 6 pages in Korean).

* cited by examiner

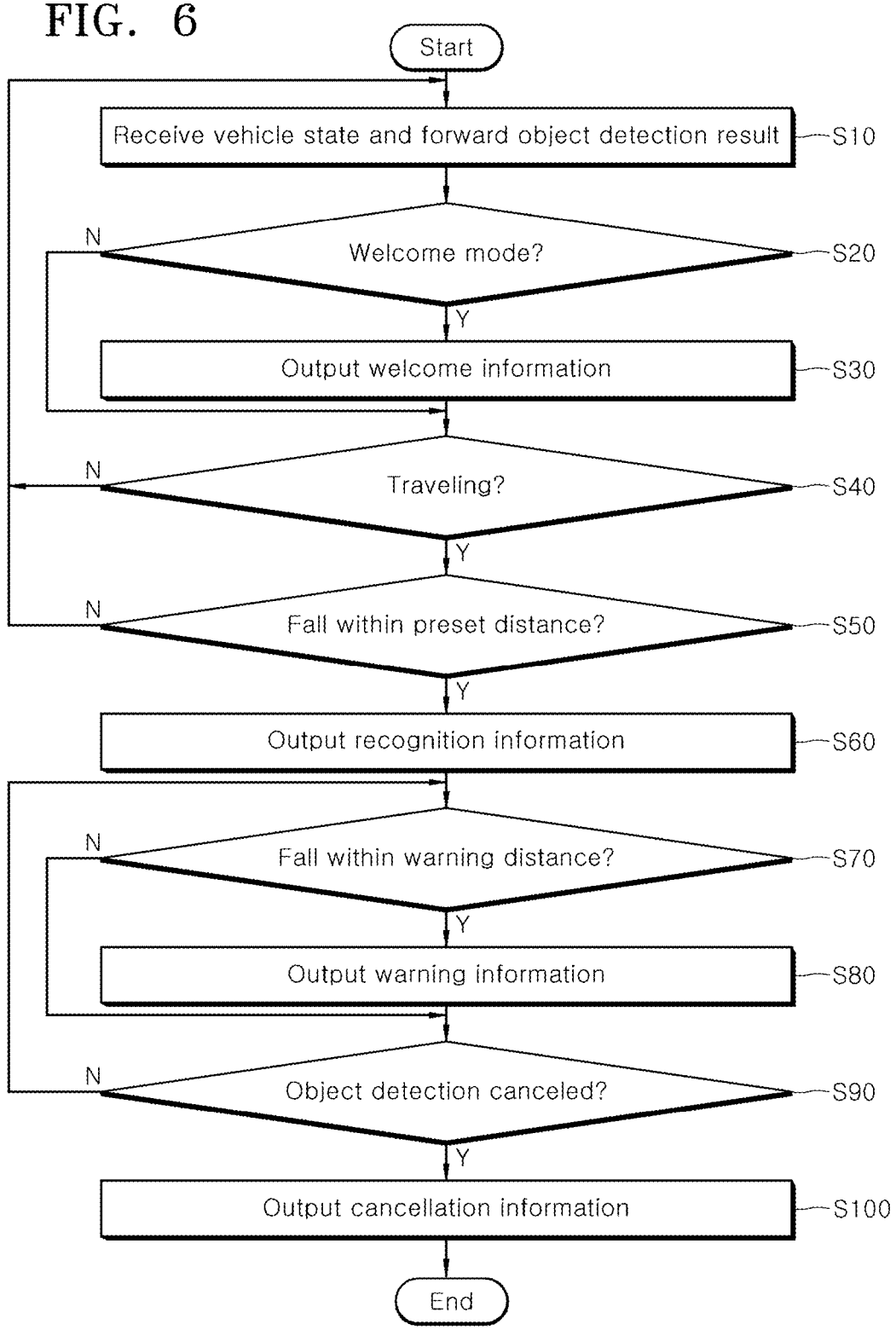

VEHICLE INFORMATION DISPLAY APPARATUS AND CONTROL METHOD THEREOF

CROSS-REFERENCE TO RELATED APPLICATIONS

This application claims the benefit under 35 U.S.C. § 119(a) of Korean Patent Application No. 10-2020-0094297 filed on Jul. 29, 2020 in the Korean Intellectual Property Office, the entire disclosure of which is incorporated herein by reference for all purposes.

BACKGROUND

Field

Exemplary embodiments of the present disclosure relate to a vehicle information display apparatus and a control method thereof, and more particularly, to a vehicle information display apparatus which includes a flip-dot display installed in a vehicle and an illumination device installed around the flip-dot display, and can accurately transfer the driving state and surrounding situation of a vehicle to a pedestrian or oncoming vehicle in the daytime or nighttime, and a control method thereof.

Discussion of the Background

In general, an image display apparatus refers to an apparatus that outputs information as an image using a screen. The image display apparatus may include a general monitor as one of computer output apparatuses. Output data are mostly expressed as characters, symbols, figures, images, voice and the like. All data except the voice, among the above-described data, are recognized with the eyes. The image display apparatus temporarily displays such information through the screen.

Examples of such an image display apparatus include a CRT (Cathode Ray Tube), LCD (Liquid Crystal Display), TFT-LCD (Thin Film Transistor-LCD), PDP (Plasma Display), flexible display, HMD (Head Mounted Display) and the like.

Recently, a flip-dot display has been developed, which rotates a flip disk having surfaces with different colors by changing the polarity of an electromagnet, thereby implementing a pixel.

The related art of the present disclosure is disclosed in Korean Patent No. 10-1487904 published on Feb. 4, 2015 and entitled "Flip Dot Display Element using Electromagnet and Assembly Module Thereof".

An autopilot system is embedded in various driving units for a driver, and performs autonomous driving through driving location search. The autopilot system is mainly applied to a ship, airplane and the like. Recently, the autopilot system is also applied to a vehicle that travels on the road, and informs a user of various pieces of information such as a traveling route and road congestion through a monitor, or autonomously drives the vehicle or controls the traveling state of the vehicle.

An autonomous vehicle having such an autopilot system mounted therein needs to not only warn a pedestrian of the vehicle's approaching such that the pedestrian can pay attention to the vehicle, but also transfer the driving state of the vehicle to an oncoming vehicle such that the oncoming vehicle recognizes the autonomous driving state.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle information display apparatus includes: at least one processor configured to receive a vehicle state of a vehicle, and detect a forward object ahead of the vehicle; a flip-dot display installed in the vehicle and configured to implement a pixel by rotating a flip disk; and an illumination module installed around the flip-dot display, and configured to illuminate a surface of the flip-dot display.

The at least one processor may include: a vehicle state inputter configured to receive the vehicle state; and a font detector configured to detect the forward object ahead of the vehicle.

The at least one processor may further include: an operation sound outputter; and a controller configured to receive the vehicle state from the vehicle state inputter, and output any one of recognition information, warning information, and cancellation information by operating either one or both of the flip-dot display and the operation sound outputter according to a detected distance at which the forward object is detected by the front detector.

The outputting of the any one of the recognition information, the warning information, and the cancellation information may include outputting any one or any combination of any two or more of a symbol, an icon, an image, and a character through the flip-dot display.

The operation sound outputter may be configured to indicate an operation state of the vehicle information display apparatus. The controller may be further configured to operate the flip-dot display to output a warning sign, and increase a volume of the operation sound outputter to output a warning sound.

The controller may be further configured to: output the recognition information, in response to the detected distance at which the forward object is detected falling within a preset distance; output the warning information, in response to the detected distance falling within a warning distance; and output the cancellation information, in response to the detected distance increasing or the detecting of the forward object being canceled.

The controller may be further configured to output a driving state through the flip-dot display according to a driving mode. The controller may be further configured to differently display and output an autonomous driving state, a semi-autonomous driving state, and a driver onboard state according to the driving mode.

The vehicle information display apparatus may further include an illuminance sensor configured to detect ambient brightness of the vehicle. The controller may be further configured to operate the illumination module to operate the flip-dot display according to the ambient brightness.

The flip disk may have a front surface and a rear surface that have different reflection characteristics.

The illumination module may include a daytime driving light module. The daytime driving light module may be disposed along an edge of the flip-dot display.

The flip-dot display may be installed at any one or any combination of any two or more of a front grill, a trunk, a roof, a rear bumper, and a rear window glass of the vehicle.

The flip-dot display may be formed at a front grill of the vehicle, such that a central portion of the flip-dot display has a protruding curved surface.

In another general aspect, a method to control a vehicle information display apparatus includes: receiving, by a controller, a vehicle state of a vehicle and a detection result of detecting a forward object; receiving, by the controller, the vehicle state and the detection result of the detecting of the forward object, and determining whether the forward object is detected while the vehicle travels; and outputting, by the controller, any one of recognition information, warning information, and cancellation information by operating a flip-dot display according to a detected distance of the forward object, in response to the forward object being detected during driving of the vehicle.

The flip-dot display may include a flip disk having a front surface and a rear surface that have different reflection characteristics.

The outputting of the any one of the recognition information, the warning information, and the cancellation information may include outputting any one or any combination of any two or more of a symbol, an icon, an image, and a character through the flip-dot display.

The outputting of the warning information may include operating the flip-dot display to output a warning sign, and increasing a volume of an operation sound outputter to output a warning sound.

The outputting of the any one of the recognition information, the warning information, and the cancellation information may include: outputting the recognition information, in response to the detected distance falling within a preset distance; outputting the warning information, in response to the detected distance falling within a warning distance; and outputting the cancellation information, in response to the detected distance increasing or the detecting of the forward object being canceled.

The method may further include outputting, by the controller, a driving state through the flip-dot display according to a driving mode. The controller may differently display and output an autonomous driving state, a semi-autonomous driving state, and a driver onboard state according to the driving mode.

The method may further include: determining, by the controller, ambient brightness while operating the flip-dot display; and operating, by the controller, an illumination module. The operating of the illumination module may include operating a daytime driving light module of the illumination module, disposed along an edge of the flip-dot display.

In another general aspect, a non-transitory, computer-readable storage medium stores instructions that, when executed by a processor, cause the processor to perform the method described above.

Other features and aspects will be apparent from the following detailed description, the drawings, and the claims.

BRIEF DESCRIPTION OF THE DRAWINGS

FIG. 6 is a flowchart for describing a control method of a vehicle information display apparatus in accordance with an embodiment of the present disclosure.

DETAILED DESCRIPTION OF THE ILLUSTRATED EMBODIMENTS

Figure 1:
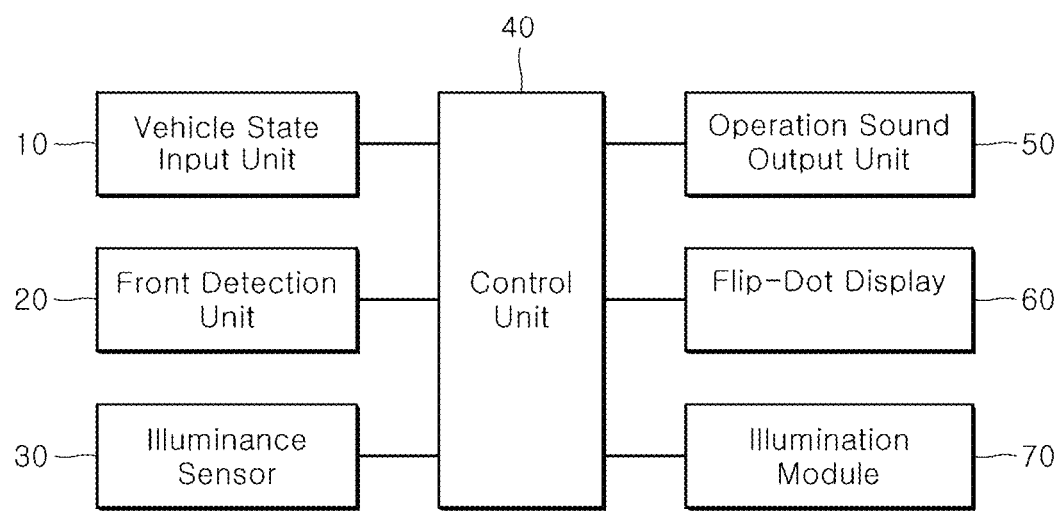
FIG. 1 is a block configuration diagram illustrating a vehicle information display apparatus in accordance with an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, a vehicle information display apparatus and a control method thereof will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
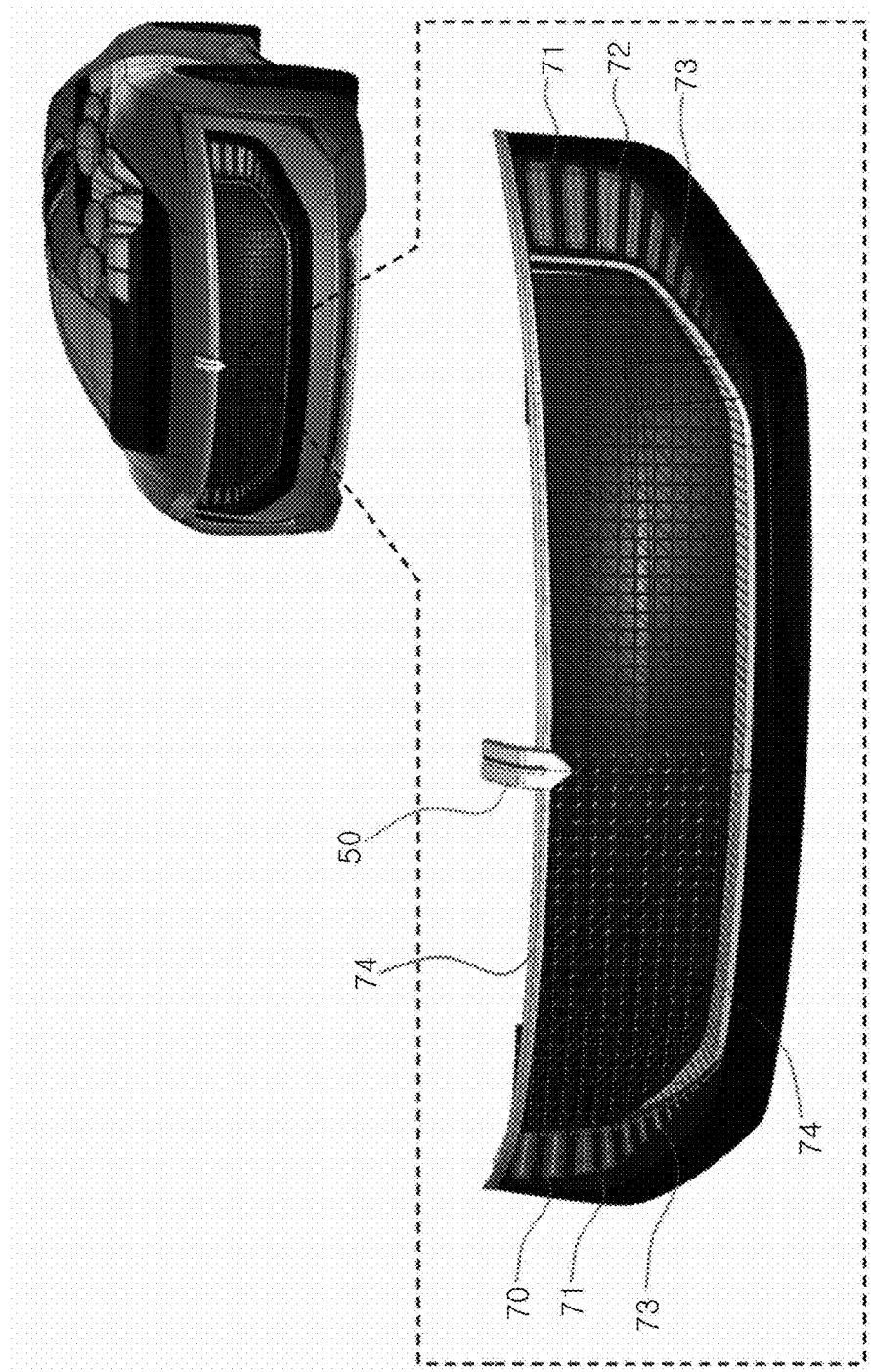
FIG. 2 is a diagram illustrating that the vehicle information display apparatus in accordance with the embodiment of the present disclosure is mounted.
Figure 3:
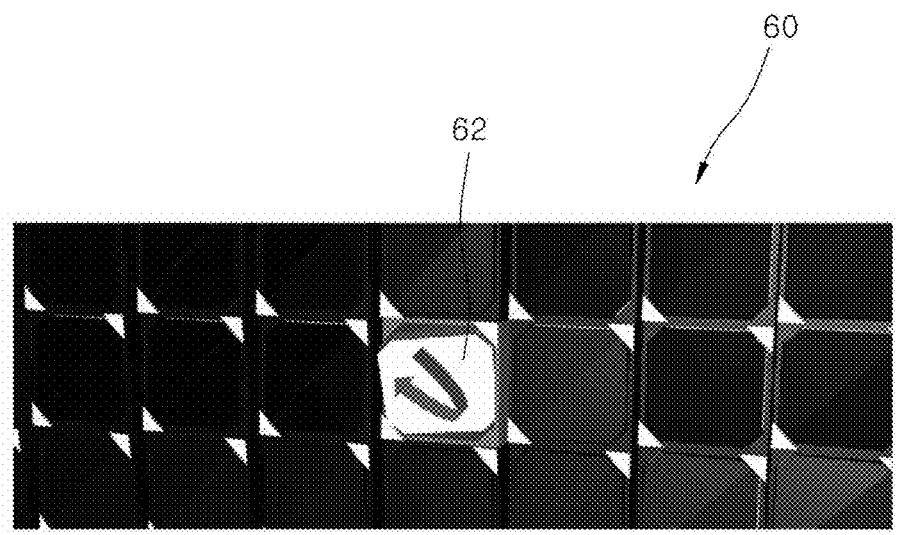
FIG. 3 is a configuration diagram illustrating a flip-dot display of the vehicle information display apparatus in accordance with the embodiment of the present disclosure.
Figure 4:
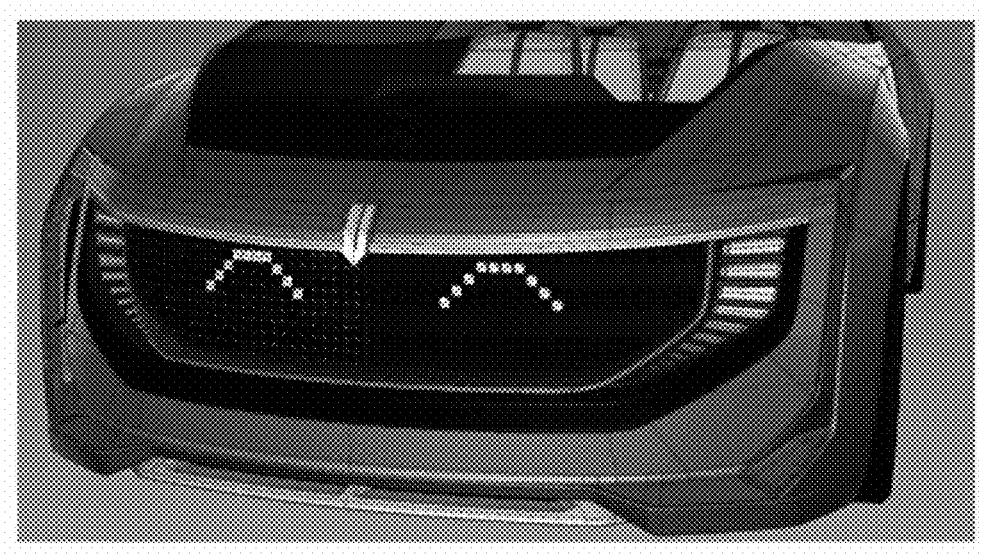
FIG. 4 is a diagram illustrating that cancellation information is displayed through the vehicle information display apparatus in accordance with the embodiment of the present disclosure.
Figure 5:
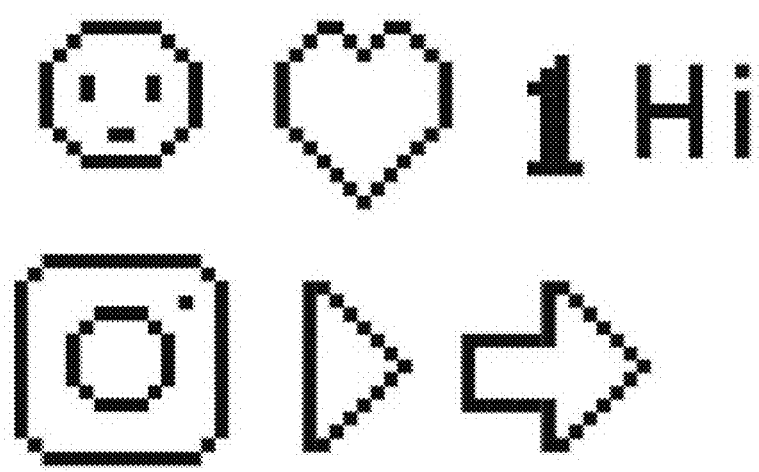
FIG. 5 is a diagram illustrating pixel images which can be displayed through the vehicle information display apparatus in accordance with the embodiment of the present disclosure.

FIG. 1 is a block configuration diagram illustrating a vehicle information display apparatus in accordance with an embodiment of the present disclosure, FIG. 2 is a diagram illustrating that the vehicle information display apparatus in accordance with the embodiment of the present disclosure is mounted, FIG. 3 is a configuration diagram illustrating a flip-dot display of the vehicle information display apparatus in accordance with the embodiment of the present disclosure, FIG. 4 is a diagram illustrating that cancellation information is displayed through the vehicle information display apparatus in accordance with the embodiment of the present disclosure, and FIG. 5 is a diagram illustrating pixel images which can be displayed through the vehicle information display apparatus in accordance with the embodiment of the present disclosure.

As illustrated in FIG. 1, the vehicle information display apparatus in accordance with the embodiment of the present disclosure may include a vehicle state input unit (or vehicle state inputter) 10, a front detection unit (or front state detector) 20, an illuminance sensor 30, an operation sound output unit (or operation sound outputter) 50, a flip-dot display 60, an illumination module 70 and a control unit (or controller) 40.

The vehicle state input unit 10 may receive the operation state and driving state of a vehicle, and provide the received information to the control unit 40. Thus, the control unit 40 can determine a situation which is to be transferred to a pedestrian or oncoming vehicle, and control the flip-dot display 60 to display the situation.

For example, the control unit 40 may determine whether the vehicle is traveling, and determine an autonomous driving state, a semi-autonomous driving state, a driver onboard state, a stop state, a state in which the vehicle is started after being stopped, an acceleration state or the like.

The front detection unit 20 may detect a forward object ahead of the vehicle, and provide the detected information to the control unit 40, such that the control unit 40 can output any one of recognition information, warning information and cancellation information according to the detected distance at which the forward object is detected.

The illuminance sensor 30 may sense the ambient brightness of the vehicle and provide the sensed information to the control unit 40. Thus, the illumination module 70 may be automatically operated even though the illumination module is not independently operated according to the ambient brightness.

The operation sound output unit 50 may notify the operation state of the vehicle information display apparatus, such that a pedestrian recognizes the state in which the vehicle is approaching.

The operation sound output unit 50 may amplify and output the sound of a VESS (Virtual Engine Sound System).

The flip-dot display 60 may be installed at a front grill of the vehicle as illustrated in FIG. 2, and have a central portion with a protruding curved surface, such that light of the illumination module 70 disposed around the flip-dot display 60 is emitted to secure visibility even in the nighttime.

In the present embodiment, the case in which the flip-dot display 60 is installed at the front grill is taken as an example for description. However, the flip-dot display 60 may be mounted not only at a trunk, roof, rear bumper or rear window glass of the vehicle, but also inside the vehicle, in order to display information of the vehicle.

As illustrated in FIG. 3, the flip-dot display 60 may implement a pixel by rotating a flip disk 62 whose front and rear surfaces have different colors. With this structure that rotates the flip disk 62 by changing the polarity of an electromagnet, the volume and weight of the vehicle information display apparatus may be reduced further than a structure that rotates the flip disk by using an actuator, which makes it possible to reduce the manufacturing cost.

The flip-dot display 60 may implement a pixel by rotating the flip disk 62 whose front and rear surfaces have different colors, and thus improve visibility in the daytime, compared to a light emitting display.

When the flip-dot display 60 is installed outside the vehicle, the flip-dot display 60 may further include a cover for preventing foreign matters.

As illustrated in FIG. 2, the illumination module 70 may be installed around the flip-dot display 60, and illuminate the surface of the flip-dot display 60 to improve the visibility in the nighttime.

At this time, when the front and rear surfaces of the flip disk 62 are configured to have different reflection characteristics (e.g. gloss and matt), the reflectance of the light may be changed by the rotation angle of the flip disk 62 whose front and rear surfaces have different reflection characteristics, depending on the installation angle of the illumination module 70. Thus, various pieces of information may also be displayed through light reflected from a road surface, which makes it possible to improve the visibility in the nighttime.

The illumination module 70 may include any one or more of a headlight module 71, a turn indicator module 72, a position lamp module 73, a daytime driving light module 74 and the like.

Furthermore, the daytime driving light module 74 may be disposed along the edge of the flip-dot display 60, and operated by a daytime driving light turn-on switch (not illustrated) in the daytime or operated according to the ambient brightness in the nighttime, thereby illuminating the flip-dot display 60 to improve the visibility in the nighttime.

The control unit 40 may receive the vehicle state from the vehicle state input unit 10, and output information based on the vehicle state through the flip-dot display 60.

For example, as illustrated in FIG. 5, the flip-dot display 60 may not only display various pieces of information using pixel icons or the like, but also display information through symbols, icons, images and characters. Depending on a driving mode, the flip-dot display 60 may differently display the autonomous driving state, the semi-autonomous driving state, and the driver onboard state.

Furthermore, the control unit 40 may operate any one or more of the flip-dot display 60 and the operation sound output unit 50 according to the vehicle state and the detected distance at which the forward object is detected by the front detection unit 20, and thus output any one of the recognition information, the warning information and the cancellation information.

The control unit 40 may output the recognition information when the detected distance at which the forward object is detected falls within a preset distance, output the warning information when the detected distance falls within a warning distance, and output the cancellation information when the detected distance increases or the object detection is canceled.

For example, when outputting the warning information, the control unit 40 may not only operate the flip-dot display 60 to output a warning sign, but also raise the volume of the operation sound output unit 50 to output a warning sound, such that a pedestrian can directly recognize the vehicle's approaching.

The cancellation information may be displayed as an emotional icon indicating a thank-you sign as illustrated in FIG. 4.

When outputting any one of the recognition information, the warning information and the cancellation information through the flip-dot display 60, the control unit 40 may output any one or more of a symbol, icon, image and character as the information. At this time, the control unit 40 may differently display and output the driving state of the vehicle, according to the autonomous driving state, the semi-autonomous driving state, the driver onboard state or the like.

When operating the flip-dot display 60 according to the ambient brightness inputted from the illuminance sensor 30, the control unit 40 may operate the illumination module 70 to improve the visibility in the nighttime.

When the vehicle state from the vehicle state input unit 10 corresponds to a welcome mode, the control unit 40 may output music through the operation sound output unit 50, and output an animation or welcome signal suitable for the rhythm of the output music through the flip-dot display 60, in order to output welcome information.

As described above, the vehicle information display apparatus in accordance with the present embodiment may include the flip-dot display installed in the vehicle and the illumination device installed around the flip-dot display, and output the driving state of the vehicle as various motions and operation sounds through the flip-dot display according to the vehicle state and the detection state of the forward object. Thus, the vehicle information display apparatus may accurately transfer information to a pedestrian or oncoming vehicle in the daytime or nighttime, thereby improving the visibility and transfer force. Furthermore, the vehicle information display apparatus may drive the flip disk using an electromagnet. Therefore, it is possible to reduce the volume and weight of the vehicle information display apparatus and to reduce the manufacturing cost thereof, thereby increasing the productivity thereof.

FIG. 6 is a flowchart for describing a control method of a vehicle information display apparatus in accordance with an embodiment of the present disclosure.

As illustrated in FIG. 6, the control method of the vehicle information display apparatus in accordance with the embodiment of the present disclosure starts with step S10 in which the control unit 40 receives a vehicle state from the vehicle state input unit 10, and receives a detection result of a forward object from the front detection unit 20.

After receiving the vehicle state in step S10, the control unit 40 determines whether the vehicle state corresponds to a welcome mode, in step S20.

When the determination result of step S20 indicates that the vehicle state corresponds to the welcome mode, the control unit 40 may output music through the operation sound output unit 50, and output an animation or welcome signal suitable for the rhythm of the output music through the flip-dot display 60, in order to output welcome information, in step S30.

When the determination result of step S20 indicates that the vehicle state does not correspond to the welcome mode, the control unit 40 determines whether the vehicle is traveling, in step S40.

When the determination result of step S40 indicates that the vehicle is not traveling, the control unit 40 may return to step S10 to receive the vehicle state and the detection result of the forward object.

On the other hand, when the determination result of step S40 indicates that the vehicle is traveling, the control unit 40 determines whether the detected distance at which the forward object is detected falls within a preset distance, in step S50.

When the determination result of step S50 indicates that no forward object is detected or the detected distance does not fall within the preset distance, the control unit 40 may return to step S10 to continuously receive the vehicle state and the detection result of the forward object.

However, when the determination result of step S50 indicates that the detected distance falls within the preset distance, the control unit 40 operates the flip-dot display 60 and the operation sound output unit 50 to output recognition information, in step S60.

As illustrated in FIG. 2, the flip-dot display 60 may be installed at the front grill of the vehicle so as to transfer the vehicle state to a pedestrian or oncoming vehicle. However, the flip-dot display 60 may be mounted not only at the trunk, roof, rear bumper or rear window glass of the vehicle, but also inside the vehicle, in order to display information of the vehicle.

As illustrated in FIG. 3, the flip-dot display 60 may display information by implementing a pixel through a process of rotating the flip disk 62 whose front and rear surface have different colors, by changing the polarity of the electromagnet, thereby improving the visibility in the daytime. At this time, the operation sound output unit 50 may output a virtual engine sound as an operation sound of the flip-dot display 60.

As illustrated in FIG. 2, the illumination module 70 may be installed around the flip-dot display 60 so as to illuminate the surface of the flip-dot display 60, thereby improving the visibility in the nighttime.

At this time, when the front and rear surfaces of the flip disk 62 are configured to have different reflection characteristics (e.g. gloss and matt), the reflectance of the light may be changed by the rotation angle of the flip disk 62 whose front and rear surfaces have different reflection characteristics, depending on the installation angle of the illumination module 70. Thus, various pieces of information may also be displayed through light reflected from a road surface, which makes it possible to improve the visibility in the nighttime.

After outputting the recognition information in step S60, the control unit 40 determines whether the detected distance falls within the warning distance, in step S70.

When the determination result of step S70 indicates that the detected distance falls within the warning distance, the control unit 40 operates the flip-dot display 60 and the operation sound output unit 50 to output warning information, in step S80.

At this time, in order to warn a pedestrian of the vehicle's approaching, the control unit 40 may increase the volume of the operation sound output unit 50, and output a warning sound.

When the determination result of step S70 indicates that the detected distance does not fall within the warning distance or after outputting the warning information in step S80, the control unit 40 determines whether the object detection has been canceled, in step S90.

When the determination result of step S90 indicates that the detected distance increases or the object detection is not canceled because no object is detected, the control unit 40 may return to step S70 to continuously determine whether the detected distance falls within the warning distance.

However, when the determination result of step S90 indicates that the object detection has been canceled, the control unit 40 operates the flip-dot display 60 and the operation sound output unit 50 to output cancelation information, in step S100.

For example, as illustrated in FIG. 4, the control unit 40 may output an emotional icon indicating a thank-you sign as the cancellation information.

When outputting any one of the recognition information, the warning information and the cancellation information through the flip-dot display 60, the control unit 40 may output a symbol, icon, image or character as the information, as illustrated in FIG. 5. At this time, according to the driving mode, the control unit 40 may differently display and output the driving state of the vehicle such as the autonomous driving state, the semi-autonomous driving state or the driver onboard state.

When outputting the recognition information, the warning information and the cancellation information according to the detected distance of the forward object, the control unit 40 may determine the ambient brightness inputted from the illuminance sensor 30, and operate the daytime driving light module 74 of the illumination module 70, disposed along the edge of the flip-dot display 60, so as to illuminate the flip-dot display 60, thereby improving the visibility in the nighttime.

In the above-described control method of the vehicle information display apparatus in accordance with the present embodiment, the flip-dot display may be installed in the vehicle, the illumination device may be installed around the flip-dot display, and various motions and operation sounds may be outputted as the driving state of the vehicle through the flip-dot display according to the vehicle state and the detection state of the forward object. Thus, information can be accurately transferred to a pedestrian or oncoming vehicle in the daytime or nighttime, which makes it possible to improve the visibility and transfer force.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device. The processor also includes a communication device, such as a computer, cellular phone, PDA (Personal Digital Assistant) and another device, which facilitates information communication between end users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A vehicle information display apparatus comprising:
   a flip-dot display disposed on a vehicle such that the flip-dot display is externally visible, the flip-dot display comprising a plurality of flip disks each including front and rear surfaces, the front and rear surfaces having different colors;
   an illumination module installed around the flip-dot display and configured to illuminate a surface of the flip-dot display;
   a controller configured to control the flip-dot display;
   a vehicle state input unit configured to receive an operation state and a driving state of the vehicle, and provide received information to the controller;
   a front detection unit disposed at a front of the vehicle and configured to detect a forward object ahead of the vehicle, and provide detection information to the controller; and
   an operation sound output unit configured to output sound;
   wherein the controller is further configured to:
   determine a distance between the object and the front detector; and
   output any one of recognition information, warning information, and cancellation information by outputting at least one of a symbol, an icon, an image, and a character through the flip-dot display, according to the received state of the vehicle and the determined distances;
   control the operation sound output unit to output sound corresponding to an operation state of the vehicle;
   operate the flip-dot display to output a warning sign; and
   operate the operation sound output unit to output a warning sound with increase in volume corresponding to the warning sign output by the flip-dot display.

2. The vehicle information display apparatus of claim 1, wherein any one of the recognition information, the warning information, and the cancellation information is output by controlling the flip-dot display to implement a corresponding 2 image by rotating at least one of the flip disks.

3. The vehicle information display apparatus of claim 2, wherein the controller is further configured to, based on the received state of the vehicle, output any one of the recognition information, the warning information, and the cancellation information by operating either one or both of the flip-dot display and the operation sound output unit.

4. The vehicle information display apparatus of claim 3, wherein the controller is further configured to:
   control the operation sound output unit to indicate an operation state of the vehicle information display apparatus.

5. The vehicle information display apparatus of claim 3, wherein the controller is further configured to:
   output the recognition information, in response to the detected distance at which the object is detected falling within a preset distance;
   output the warning information, in response to the detected distance falling within a warning distance; and
   output the cancellation information, in response to the detected distance increasing or the detecting of the object being canceled.

6. The vehicle information display apparatus of claim 3, wherein the controller is further configured to control the flip-dot display to:
   output the driving state according to a driving mode; and
   differently display and output an autonomous driving state, a semi-autonomous driving state, and a driver onboard state according to the driving mode.

7. The vehicle information display apparatus of claim 3, further comprising;
   an illuminance sensor to detect ambient brightness of the vehicle,
   wherein the controller is further configured to control the illumination module to provide backlight to the flip-dot display according to the ambient brightness detected by the illuminance sensor.

8. The vehicle information display apparatus of claim 1, wherein the flip disk comprises a front surface and a rear surface that have different reflection characteristics.

9. The vehicle information display apparatus of claim 1, wherein the illumination module comprises a daytime driving light, and
   wherein the daytime driving light is disposed along an edge of the flip-dot display.

10. The vehicle information display apparatus of claim 1, wherein the flip-dot display is installed at any one or any two or more of a front grill, a trunk, a roof, a rear bumper, and a rear window glass of the vehicle.

11. The vehicle information display apparatus of claim 1, wherein the flip-dot display is formed at a front grill of the vehicle, such that a central portion of the flip-dot display has a protruding curved surface.

12. A processor-implemented method to control a vehicle information display apparatus, the method comprising:
   detecting an object ahead of the vehicle based on sensing information received from a front detection unit disposed at a front of the vehicle and configured to detect a forward object ahead of the vehicle, and provide detection information to a controller;

determining a distance between the front detection unit and the detected object;

receiving a state of a vehicle and a detection result of detecting the object;

determining whether the object is detected while the vehicle is in motion based on the received state of the vehicle and the detection result of detecting the object;

outputting any one of recognition information, warning information, and cancellation information by outputting any one or any combination of any two or more of a symbol, an icon, an image, and a character through a flip-dot display according to the received state of the vehicle and the determined distance;

outputting any one of the recognition information, the warning information, and the cancellation information by controlling the flip-dot display to implement a corresponding pixel image by rotating at least one of the flip disks; and, illuminating a surface of the flip-dot display, wherein the outputting of the warning information comprises:
  operating the flip-dot display to output a warning sign; and
  controlling a sound outputter to output a warning sound with increase in volume corresponding to the warning sign output by the flip-dot display.

13. The method of claim 12, wherein the at least one of the flip disks includes a front surface and a rear surface that have different reflection characteristics.

14. The method of claim 12, wherein the outputting comprises outputting any one or any combination of any two or more of a symbol, an icon, an image, and a character through the flip-dot display.

15. The method of claim 12, wherein the outputting comprises:
  outputting the recognition information, in response to the detected distance falling within a preset distance;
  outputting the warning information, in response to the detected distance falling within a warning distance; and
  outputting the cancellation information, in response to the detected distance increasing or the detecting of the object being canceled.

16. The method of claim 12, further comprising:
  outputting a driving state through the flip-dot display according to a driving mode; and
  differently displaying and outputting an autonomous driving state, a semi-autonomous driving state, and a driver onboard state according to the driving mode.

17. The method of claim 12, further comprising:
  determining ambient brightness while operating the flip-dot display; and
  operating an illumination module for illuminating the surface of the flip-dot display,
  wherein the operating of the illumination module comprises operating a daytime driving light module disposed along an edge of the flip-dot display.

18. A non-transitory computer-readable recording medium having recorded thereon at least one program comprising commands, which, when executed by a computer, performs a method, the method comprising:
  detecting an object ahead of the vehicle based on sensing information received from a front detector detection unit disposed at a front of the vehicle and configured to detect a forward object ahead of the vehicle, and provide detection information to a controller;
  determining a distance between the front detection unit and the detected object;
  receiving a state of the vehicle and a detection result of the detecting of the object;
  determining whether the object is detected while the vehicle is in motion based on the received state of the vehicle and the detection result of detecting the object;
  outputting any one of recognition information, warning information, and cancellation information by outputting any one or any combination of any two or more of a symbol, an icon, an image, and a character through a flip-dot display according to the received state of the vehicle and the determined distance of the object,
  outputting any one of the recognition information, the warning information, and the cancellation information by controlling the flip-dot display to implement a corresponding pixel image comprising a plurality of pixels by rotating at least one flip disk among a plurality of flip disks; and
  illuminating a surface of the flip-dot display,
  wherein the outputting of the warning information comprises:
    operating the flip-dot display to output a warning sign; and
    controlling a sound outputter to output a warning sound with increase in volume corresponding to the warning sign output by the flip-dot display.

* * * * *